United States Patent [19]
Ando et al.

[11] Patent Number: 4,711,528
[45] Date of Patent: Dec. 8, 1987

[54] DRIVE COUPLING DEVICE FOR OPTICAL INSTRUMENTS

[75] Inventors: Makoto Ando; Yukio Miki, both of Osaka, Japan

[73] Assignee: Minolta Camera Kabushiki Kaisha, Osaka, Japan

[21] Appl. No.: 767,460

[22] Filed: Aug. 20, 1985

[30] Foreign Application Priority Data

Aug. 24, 1984 [JP] Japan ................ 59-129123[U]

[51] Int. Cl.⁴ .................. G02B 7/00; F16D 1/10; F16D 1/12
[52] U.S. Cl. ................... 350/257; 192/67 R; 403/300
[58] Field of Search ............ 350/257; 403/300, 333, 403/DIG. 8; 279/1 J, 1 L, 1 K; 192/67 R, 70.27, 89 R

[56] References Cited

U.S. PATENT DOCUMENTS

| | | | |
|---|---|---|---|
| 1,012,657 | 12/1911 | Kurschus | 192/67 R |
| 1,241,713 | 10/1917 | Dahlqvist | 192/67 R |
| 3,212,613 | 10/1965 | Carlson | 192/67 R |
| 4,252,224 | 2/1981 | F'Geppert | 192/89 R |
| 4,449,807 | 5/1984 | Miki et al. | 350/257 |
| 4,564,265 | 1/1986 | Miki | 350/257 |

FOREIGN PATENT DOCUMENTS

| | | | |
|---|---|---|---|
| 57-9914 | 1/1982 | Japan . | |
| 57-177105 | 10/1982 | Japan . | |
| 57-195224 | 11/1982 | Japan . | |
| 2130331 | 5/1984 | United Kingdom | 192/89 R |
| 607077 | 5/1978 | U.S.S.R. | 192/67 R |

*Primary Examiner*—William H. Punter
*Attorney, Agent, or Firm*—Wolder, Gross & Yavner

[57] ABSTRACT

A drive coupling device for transmitting a rotational drive force from an optical instrument such as a camera body to another optical instrument such as an exchangeable lens has a construction which couples driving and driven coupling members steadily while centerizing the center axes of the driving and driven coupling members for efficient drive force transmission. A flat male engaging portion having a top surface and parallel side walls is formed on the driving coupling member while a slotted female engaging portion having a concave bottom wall and parallel side walls is formed on the driven coupling member. With the optical instruments connected to each other, the male engaging portion is brought into engagement with the female engaging portion under a force of a spring.

15 Claims, 11 Drawing Figures

DRIVE COUPLING DEVICE FOR OPTICAL INSTRUMENTS

BACKGROUND OF THE INVENTION

1. Field of the invention:

The present invention relates to a drive coupling device for use in optical instruments which are detachably combined together. The drive coupling device of the present invention is used, for example, for transmitting a drive force from a camera body as one optical instrument to a lens shifting mechanism in an interchangeable lens as another optical instrument for automatic focusing, when the interchangeable lens is mounted on the camera body.

2. Description of the Prior Art:

Drive coupling devices for optical instruments are required to be connected or disconnected automatically and reliably at the same time that the optical instruments incorporating such drive coupling devices are coupled to or detached from each other. Such drive coupling devices are disclosed in Japanese Laid-Open Utility Model Publication No. 57-9914 (hereinafter referred to as Publication (1)), Japanese Laid-Open Patent Publications Nos. 57-173809, 57-177105, and 57-195224 (hereinafter referred to as Publications (2), (3), (4), respectively), for example. In these disclosed drive coupling devices, generally, the drive coupling member in one optical instrument extends parallel to the optical axis thereof, and the driven coupling member in another optical instrument also extends parallel to the optical axis thereof. These drive and driven coupling members are connected through a male-and-female interfitting connection to each other to couple the optical instruments together.

The drive coupling device shown in Publication (1) has a male engaging portion in the form of a cross screwdriver tip, and a female engaging portion in the form of a cross-recessed screw head, the male and female engaging portions being interfittingly engageable with each other. The drive coupling device shown in the Publications (2), (3), (4) includes a flat male engaging portion and a slotted female engaging portion which can be brought into mesh with each other. The flat male and slotted female engaging portions illustrated in Publication (2) also have central female and male centering engaging portions, respectively.

The drive coupling device shown in Publication (1) is advantageous in that the male and female engaging portions can easily be interfitted and disengaged, and when in mesh with each other, they can center the drive and driven coupling members coaxially with each other. The drive coupling device is also advantageous in that the male and female engaging portions are automatically engaged and disengaged smoothly with and from each other by relative movement of the two optical instruments in a direction perpendicular to the axes of the drive and driven coupling members. These advantages are achieved by the male and female engaging portions held in contact with each other through slanted surfaces. However, when a rotative drive force is to be transmitted between the drive and driven coupling members, the male and female engaging portions are subject to a force tending to disengage them out of meshing relation due to the contact at their slanted surfaces. Thus, no stable torque transmission is achieved, and high torques cannot be transmitted by the drive and driven coupling device With the drive coupling device shown in Publications (3), (4), the male and female engaging portions are not subject to a force which would tend to disengage them in transmitting the rotative drive force. As a consequence, the disclosed drive coupling device can essentially stably transmit torques and can transmit high torques. However, the drive coupling device of this type has a disadvantage described below.

FIGS. 10 and 11 of the accompanying drawings illustrate such drive coupling device composed of a driven coupling member B in an optical instrument A and a drive coupling member D in an optical instrument C. The optical instruments A, C as combined together may not be positionally aligned or may have the driven and drive coupling members B, D disposed out of alignment. Therefore, when the optical instruments A,C are coupled together, the flat male engaging portion d and the slotted female engaging potion b may be in mesh with each other with their axes E, F out of alignment, as shown in FIGS. 10 and 11. The illustrated drive coupling device has no ability to correct such an axial misalignment. The rotative drive force is transmitted while the flat male engaging portion d and the slotted female engaging portion b are out of axial alignment, with the result that the male and female engaging portions d, b are liable to get distorted or twisted. Further, the male engaging portion d tends to rub against the inner peripheral surface of an axial receiving bore G, damaging the inner peripheral surface thereof and allowing chips from the damaged inner peripheral surface to enter between the inner peripheral surface and the outer peripheral surface of the driven coupling member B. The illustrated prior drive coupling device is therefore of a low torque transmission efficiency, has low durability, and is apt to produce noises, actually. When the drive force is transmitted from the flat male engaging portion d to the slotted female engaging portion b, the flat male engaging portion d contacts an edge b' of the slotted female engaging portion b as shown in FIG. 11. The edge b' is subject to a concentrated shock-induced stress and may be damaged thereby as when the drive coupling member D is abruptly stopped. For the above reason, the drive coupling device is less durable, and the damages make the drive coupling device poor in appearance. To eliminate the above shortcomings, the slotted female engaging portion b would have to be formed in a relatively large size.

The drive coupling device of Publication (2) transmits torques in the same manner as those of Publications (3) and (4), and has central male and female engaging portions for preventing the male and female coupling members from being misaligned during a rotation. Therefore, it is free from the disadvantages which would arise from the torque transmission by the misaligned drive and driven coupling members. However, the construction is more complex due to the "double-engaging" structure and costly to manufacture. Moreover, the male and female engaging portions have no ability to guide the male and female coupling members for centering their axes when the axes are misaligned beyond a certain degree so as not to allow engagement of the central male engaging portion into the central female engaging portion.

SUMMARY OF THE INVENTION

It is an object of the present invention to provide a drive coupling device having drive and driven coupling members which can easily be connected and disconnected, remain stably in mesh with each other, can stably transmit torques, and can transmit high torques.

Another object of the present invention is to provide a drive coupling device composed of drive and driven coupling members which can be brought into mesh with each other without being misaligned.

Still another object of the present invention is to provide a drive coupling device which is highly durable, and will not produce noises and not be damaged during operation.

To achieve the object, a drive coupling device of the present invention includes one of driving and driven coupling members on a first optical instrument and the other of the driving and driven coupling members on a second optical instrument detachably attached on the first optical instrument. The rotational axes of the driving and driven coupling members extend parallelly to the optical axes of the first and second optical instruments. A pair of connecting portions extending perpendicularly to the rotational direction of the driving and driven coupling members are formed on the driving and driven coupling members, respectively, to connect the two coupling members for rotation. A first surface is formed at a tip end of one of the coupling members and at a tip end of the other coupling member is formed a second surface which is brought into contact with the first surface under a biasing force of a biasing means biasing at least one of the coupling members in the direction parallel to their rotational axes. The second surface has a centerlizing guide slope for guiding the first surface therealong so that the rotational axes of the coupling members come into alignment with each other.

With the above construction, when the driving coupling member is rotated by a driving means, the rotation is transmitted to the driven shaft through the pair of connecting portions. A stable connection is established during the rotation since no force disconnecting the driving and driven coupling members from each other is produced because of the pair of connecting portions extending perpendicularly to the rotational direction of the coupling members. Moreover, as the centerlizing guide slope of the second surface guides the first surface therealong so that the rotational axes of the coupling members come into alignment with each other, there occurs no misalignment of the rotational axes. Accordingly, the drive coupling device of the present invention is capable of high torque transmission, highly durable, and will not produce noises and will not be damaged during operation.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
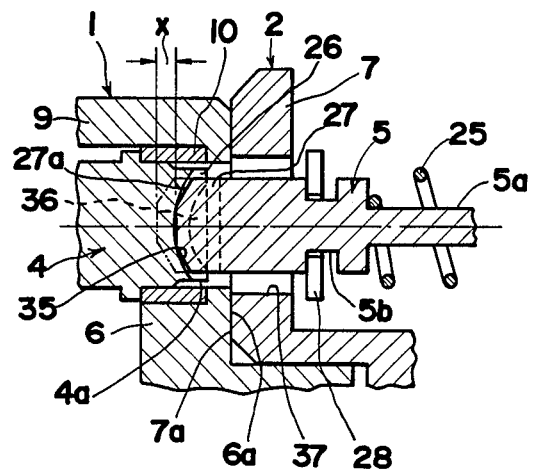
FIG. 1 is a fragmentary cross-sectional view of a drive coupling device according to an embodiment of the present invention.

FIGS. 1 through 9 show a drive coupling device according to the present invention. An interchangeable lens 1 as one or interchangeable optical instrument is detachably mounted on a camera body as another or base optical instrument. As shown in FIGS. 1 through 4, the drive coupling device has a driven coupling member 4 mounted in the interchangeable lens 1 and drive coupling member 5 mounted in the camera body 2, the driven and drive coupling members 4, 5 being interfittingly engageable for transmitting an automatic focusing force from the camera body 2 to a lens moving mechanism 3 in the interchangeable lens 1.

The interchaneable lens 1 and the camera body 2 have mounts 6, 7, respectively, for detachably coupling them. The mounts 6, 7 have annular mount surfaces 6a, 7a held in intimate contact with each other in a direction parallel to an optical axis of the interchangeable lens 1, the driven and drive coupling members 4, 5 being connectably disposed adjacent to the mount surfaces 6a, 7a.

The driven coupling member 4 in the interchangeable lens 1 is disposed parallel to the optical axis 8 and within an outer barrel 9. The driven coupling member 4 is rotatably fitted in and supported by a bearing 10 mounted in the mount 6 and a bearing 11 mounted on the inner surface of the outer barrel 9. The lens moving mechanism 3 (FIG. 4) is of a double-helicoidal construction having an intermediate helicoidal member 15 held in mesh through helicoidal teeth 13, 14 with the inner circumferential surface of the outer barrel 9 and the outer circumferential surface of a lens holder 12. The lens holder 12 is movable only in directions parallel to the optical axis 8 through engagement between a groove 16 defined in the lens holder 12 parallel to the optical axis 8 and a key 17 fixed to the inner surface of the outer barrel 9. To the front end of the intermediate helicoidal member 15, there is fixed a manual control ring 18 by means of a screw 19. The intermediate helicoidal member 15 has on its rear end a driven gear 20 meshing with a gear 21 mounted on the rear end of the driven coupling member 4. In response to rotation of the manual control ring 18 or the driven coupling member 4, the intermediate helicoidal member 15 moves the lens holder 12 parallel to the optical axis for focusing the lens 1.

The drive coupling member 5 in the camera body 2 extends parallel to the optical axis 8. The drive coupling member 5 has on a rear end thereof a flat shank 5a of a rectangular cross section fitted in a rectangular hole 23a in a driven gear 23 rotatably supported by a bearing 22 in the camera body 2. The drive coupling member 5 is retained in position by a snap ring 24 mounted on the rear end thereof and is normally urged by a biasing menas defining spring 25 toward the interchangeable lens 1. Therefore, the drive coupling member 5 is cantilevered which is slidable axially toward the interchangeable lens 1. The drive coupling member 5 is normally kept under the spring force in the position in which the tip end thereof projects toward the driven coupling member 4 by an interval x (FIG. 1) beyond accumulated positional errors in the axial direction at the time the driven and drive coupling members 4, 5 are mounted respectively in the interchangeable lens 1 and the camera body 1.

The mating end of the driven coupling member 4 has a slotted female engaging portion 26 and the mating end of the drive coupling member 5 has a flat male engaging portion 27. The drive coupling 5 is a axially retractable by abutment of the tip end of the male engaging portion 27 against the bottom of the female engaging portion 26 for the above interval x when they are interfitted. When the female and male engaging portions 26, 27 are held in meshing engagement with each other, they are coupled for co-rotation.

The female engaging portion 26 of the driven coupling member 4 is slightly retracted from the mount surface 6a. With the female and male engaging portions 26, 27 are interfitted, the male engaging portion 27 of the drive coupling member 4 projects beyond the mount surfaces 7a, 6a into meshing engagement with the female engaging portion 26.

The drive coupling member 5 in the camera body 2 has a smaller-diameter portion 5b to which there is connected an interlinking member 28 for coaction with an interchangeable lens locking member (not shown). When the mount surfaces 6a, 7a mate with each other for mounting the interchangeable lens 1 on the camera body 2, the interchangeable lens locking member is retracted until the mount surfaces 6a, 7a reach their normal mount positions. As the locking member is thus retracted, the drive coupling member 5 is resiliently retracted slightly behind the mount surface 7a against the resilient force of the spring 25 so that the drive coupling member 5 will not interfere with the lens mounting operation and will prevent the mount surface 7a and the male engaging portion 27 from being damaged. When the mount surfaces 6a, 7a have reached their normal mount positions and the locking member is moved back to lock the interchangeable lens 1 in a normal mount position with respect to the camera body 2, the drive coupling member 5 projects beyond the mount surface 7a under the resilient force of the spring 25 until the male engaging portion 27 is held against the female engaging portion 26 of the driven coupling member 4. If the female and male engaging portions 26, 27 are properly aligned with each other, then they are brought into mesh with each other as they are. If the female and male engaging portions 26, 27 are not oriented in different directions, then they will be brought into mesh with each other when they are turned into aligned orientation by the rotation of the drive coupling member 5.

The drive coupling member 5 can be rotated through a drive gear 31 and the driven gear 23 meshing therewith by a motor 30 mounted on a baseboard 29 on which the bearing 22 is mounted. The motor 30 is energized by a driver circuit 32 to which there is connected an operating circuit 34 supplied with an output signal from a focus condition detecting element 33, so that the motor 30 can be controlled by the output signal from the operating circuit 34. The operating circuit 34 issues a normal-rotation signal to drive the motor 30 in a normal direction when the operating circuit 34 is supplied with a signal indicating that the lens 1 is in a rear focused condition. When the operating circuit 34 is supplied with a signal indicating that the lens is in a front focused condition, the operating circuit 34 issues a reverse-rotation signal to drive the motor 30 in a reverse direction. The operating circuit 34 stops the generation of the motor drive signal to de-energize the motor 30 when it is supplied with a focusing signal indicating that the lens 1 is properly focused.

The rotation of the drive coupling member 5 dependent on the control mode of the motor 30 is transmitted from the driven coupling member 4 to the lens moving mechanism 3 for moving the interchangeable lens 1 toward the properly focused position from the defocused postion thereof. Upon arrival at the properly focused position, the lens 1 is stopped and now automatically focused.

The female engaging portion 26 of the driven coupling member 4 is formed as a slot defined in a smaller-diameter portion 4a diametrically across the same, and has a bottom formed as a centering guide surface 35 against which the male engaging portion 27 of the drive coupling member 5 is pressed under the resilient force of the spring 25 while being retracted by the interval x, and which serves to move the female and male engaging portions 26, 27 relatively to each other into the axially aligned position. The centering guide surface 35 comprises an arcuate concave surface curved in the longitudinal direction of the slotted female engaging portion 26. The centering guide surface 35 is effective in centering the female and male engaging portions 26, 27 out of axial misalignment in the longitudinal direction of the slotted female engaging portion 26. The slotted female engaging portion 26 also has on its mating end a conical concave surface 36 for guiding the male engaging portion 27 into proper mesh with the female engaging portion 26. The male engaging portion 27 is in the form of a rectangular tongue projecting from the tip end of the drive coupling member 5 and extending diametrically thereacross. The male engaging portion 27 has a polygonal end surface 27a bevelled at its opposite corners at an angle equal to the angle at which the conical concave surface 36 is slanted to thereby form outwardly converging side faces.

The female and male engaging portions 26, 27 of the driven and drive coupling members 4, 5 may be formed by cutting, forging, die-casting, or other suitable processes.

Figure 2:
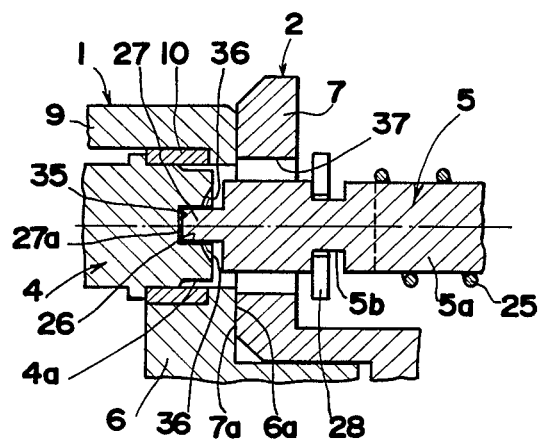
FIG. 2 is a fragmentary cross-sectional view taken along a different cross-sectional plane, showing the drive coupling device of the invention.
Figure 3:
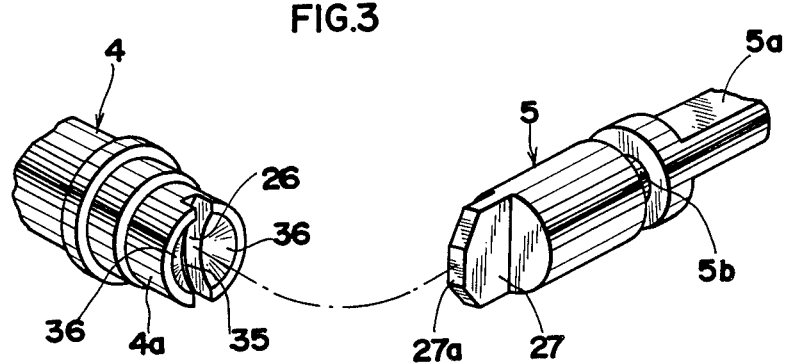
FIG. 3 is an exploded perspective view of the drive coupling device.
Figure 4:
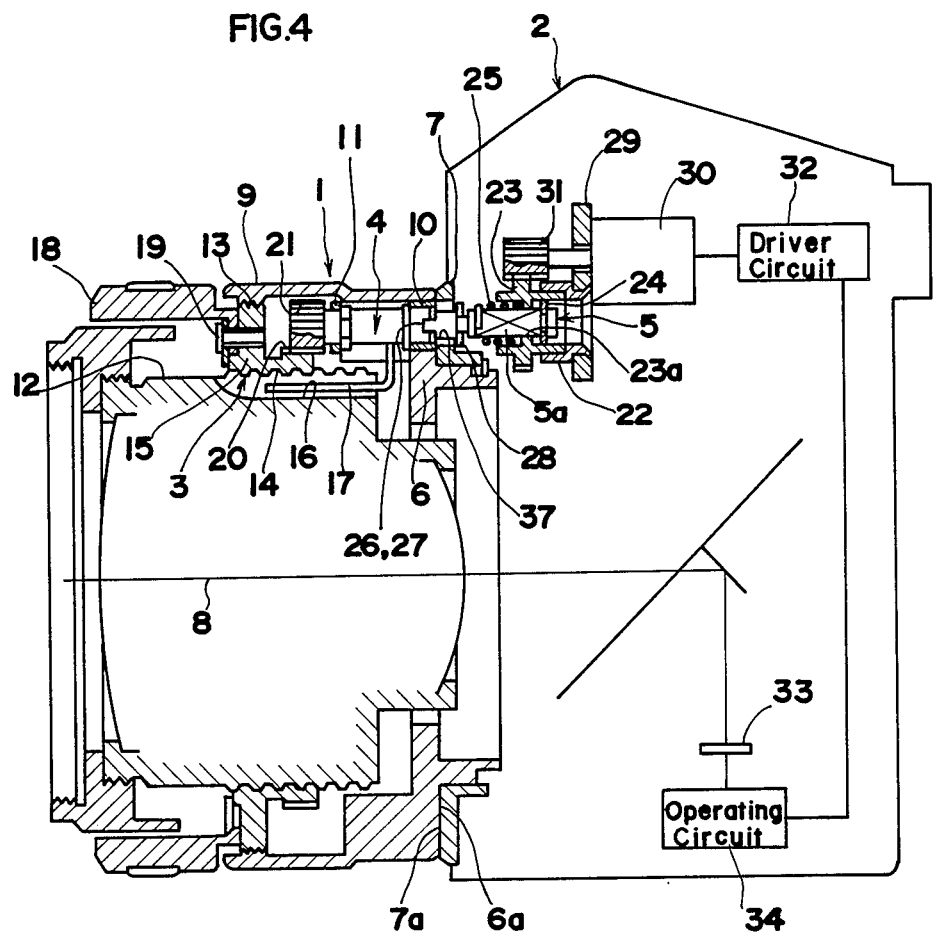
FIG. 4 is a cross-sectional view of the drive coupling device as incorporated in an optical device or camera.
Figure 5:
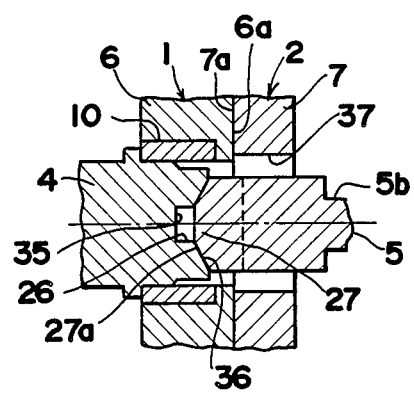
FIGS. 5 through 9 are fragmentary cross-sectional views showing the manner in which the drive coupling device in connected.

Meshing and centering of the female and male engaging portions 26, 27 will be described in greater detail. When the interchangeable lens 1 is mounted on the camera body 2 and if the axes of the driven and drive coupling members 4, 5 are aligned, then the female and male engaging portions 26, 27 are pressed against each other in axial alignment. If the female and male engaging portions 26, 27 are not oriented axially in one direction at this time, then the polygonal end surface 27a of the male engaging portion 27 is and remains pressed against the conical concave surface 36 of the female engaging portion 26, as shown in FIG. 5. The drive coupling member 5 is then rotated to bring the male engaging portion 27 into the same orientation as that of the female engaging portion 26, whereupon the male engaging portion 27 is immediately moved into mesh with the female engaging portion 26 in coaxial alignment as shown in FIGS. 1 and 2. If the female and male engaging portions 26, 27 are initially oriented in the same direction, then the male engaging portion 27 meshes with the female engaging portion 26 in coaxial alignment as shown in FIGS. 1 and 2 at the same time that the interchangeable lens 1 is mounted on the camera body 2.

Figure 6:
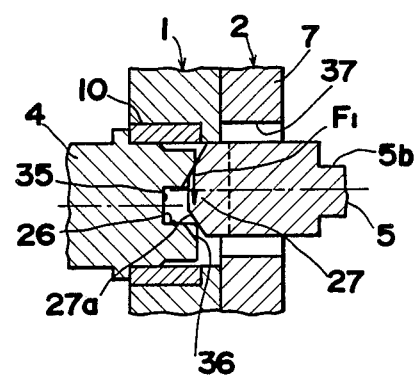
Figure 7:
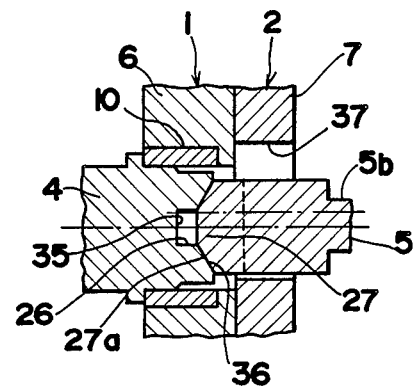

If the driven and drive coupling members 4, 5 are not coaxially aligned with each other, then the female and male engaging portions 26, 27 are pressed against each other in axial misalignment with each other. In the event that the female and male engaging portions 26, 27 are not oriented in the same direction at this time, the polygonal end surface 27a of the male engaging portion 27 is pressed against the conical concave surface 36 of the female engaging portion 26 out of coaxial alignment as shown in FIG. 6. The male engaging portion 27 is now subject to a force component $F_1$ tending to shift the male engaging portion 27 laterally in a clearance or play into axial alignment with the female engaging portion 26. The above play is provided for the following reason: The driven and drive coupling members 4, 5 tend to be forced out of coaxial alignment due to respective positional errors of the driven and/or drive coupling members 4, 5 and also due to relative positional errors induced when the interchangeable lens 1 is mounted on the camera body 2. The above play can absorb such positional errors since the tip end of the drive coupling member 5 can be laterally shifted in the play. The drive coupling member 5 is flexibly cantilevered since its rear end is supported by the driven gear 23 and the front end thereof extends through a hole 37 defined in the mount 7. Therefore, the tip end of the male engaging portion 27 can be laterally displaced under the force component $F_1$ into axial alignment with the female engaging portion 26 until the male and female engaging portions 27, 26 can automatically centered with respect to each other as shown in FIG. 7. When in the position of FIG. 7, the drive coupling member 5 is rotated to orient the female and male engaging portions 26, 27 in one direction, thereby allowing the male engaging portion 27 into mesh with the female engaging portion 26 in coaxial alignment as illustrated in FIGS. 8 and 9.

Figure 9:
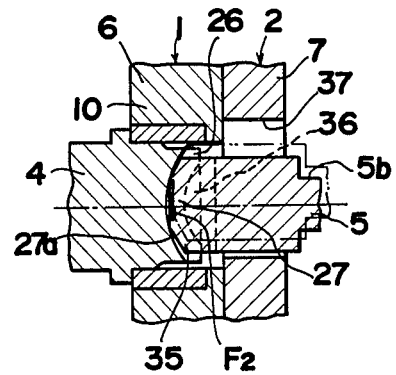
Figure 10:
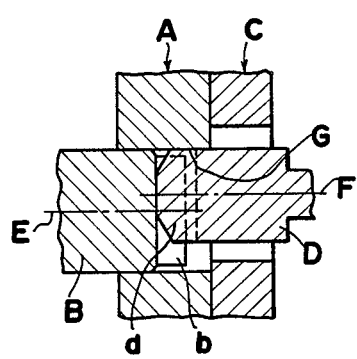
FIG. 10 is a fragmentary cross-sectional view of a conventional drive coupling device.
Figure 11:
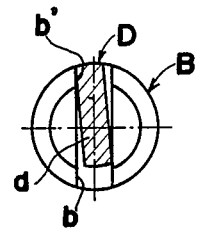
FIG. 11 is a front elevational view, partly in cross section, of the drive coupling device of FIG. 10.

In the case where the driven and drive coupling members 4, 5 are out of axial alignment even if the female and male engaging portions 26, 27 are oriented in the same direction, and also where the male engaging portion 27 is in mesh with the female engaging portion 26 because the driven and drive coupling members 4, 5 are not axially aligned in the longitudinal direction of the slotted female engaging portion 26, as indicated by the imaginary lines in FIG. 9, then the polygonal end surface 27a of the male engaging portion 27 is pressed against the centering guide surface 35 at the bottom of the female engaging portion 26 and is subject to a force component $F_2$ tending to move the male engaging portion 27 laterally into axial alignment with the female engaging portion 26. Therefore, the drive coupling member 5 is moved so that the male engaging portion 27 thereof will be brought into axial alignment with the female engaging portion 26 as indicated by the solid lines in FIG. 9.

Figure 8:
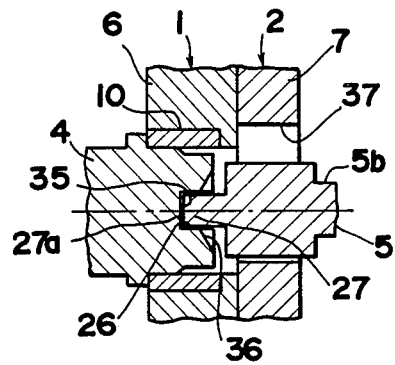

The female and male engaging portions 26, 27 as coaxially aligned as indicated by the solid lines in FIGS. 8 and 9 can stably held in mesh with each other under the meshing force and the centering action caused by the force component acting on the polygonal end surface 27a to displace the same along the centering guide surface 35 into the axial aligned position. The rotative drive force can now be transmitted from the drive coupling member 5 to the driven coupling member 4 smoothly and efficiently without twisting or distorting the driven and drive coupling members 4, 5.

The female and male engaging portions 26, 27 as meshing with each other are positioned within the given play in the transverse direction of the slotted female engaging portion 26, and are also positioned in coaxial alignment in the longitudinal direction of the slotted female engaging portion 26 by the centering action between the centering guide surface 35 and the polygonal end surface 27a. Therefore, the conical concave surface 36 may be dispensed with since it is not dispensable for positioning the female and male engaging portions 26, 27 in the above fashion. A guide portion for the sole purpose of facilitating the male engaging portion 27 to mesh with the female engaging portion 26 would simply be formed by bevelling the entrance of the slotted female engaging portion 26. Alternatively, the male engaging portion 27 would be bevelled to reduce the width of the tip end thereof for the same purpose.

Although not shown, the interchangeable optical instrument to be mounted on the camera body may be an intermediate optical instrument to be disposed between the interchangeable lens and the camera body e.g. an extention ring, a rear converter. The coupling member mounted in such an intermediate optical instrument may be the drive coupling member or the driven coupling member as described above. The drive coupling device of the present invention may be employed to transmit various drive forces other than the force for automatically focusing the lens, such as a force for automatically adjusting a diaphragm in an exchangeable lens.

Although a certain preferred embodiment has been shown and described, it should be understood that many changes and modifications may be made therein without departing from the scope of the appended claims.

What is claimed is:

1. A drive coupling device for a first optical instrument provided with a driving means and a second optical instrument provided with a load, comprising;
    a drive coupling member rotatably supported in said first optical instrument with its rotational axis extending parallel to an optical axis of said first optical instrument and rotated by said driving means;
    a driven coupling member rotatably supported in said second optical instrument with its rotational axis extending parallel to an axis of said second optical instrument and being coupled with said driving coupling member so that said driven coupling member is rotated together with said driving coupling member for shifting sadi load;
    motion transmitting means including a recess formed in one of the coupling members and a projection formed on the other of the coupling members for coupling with said reces when the angular positions of said coupling members are coincident with each other so as to transmit the rotation from said driving coupling member to said driven coupling member;
    means for biasing at least one of said coupling members along the rotational axis for axially coupling said coupling members with each other;

a first guide surface formed at the tip end of said one of the coupling members so as to be brought into axial contact with said projection under a biasing force of said biasing means when the angular positions of said coupling members are not coincident with each other thereby guiding said projection therealong for aligning the rotational axes of said coupling members with each other; and a second guide surface formed at the bottom of said recess so as to be brought into axial contact with said projection under a biasing force of said biasing means when the angular positions of said coupling member are coincident with each other thereby guiding said projection therealong for aligning the rotational axes of said coupling members with each other.

2. A drive coupling device as set forth in claim 1, wherein said second guide surface is formed as a concave curved surface.

3. A drive coupling device as set forth in claim 1, wherein said second first surface is formed as a conical concave surface.

4. A drive coupling device as set forth in claim 1, further comprising bearings arranged in said first and second optical instruments respectively for rotatably supporting said driving and driven coupling members.

5. A drive coupling device as set forth in claim 2 or 3, wherein said projection and said recess are formed as a flat male portion and a slotted female portion respectively, for fitting with each other.

6. A drive coupling device as set forth in claim 3, wherein said projection includes an incline surface having a gradient almost the same as that of said conical concave surface.

7. An exchangeable optical instrument detachably attached to a main optical body having a driving means, a driving shaft rotated by said driving means, an engaging projection disposed on the tip end of said driving shaft, and a biasing means biasing said driving shaft for projecting from said main optical body, comprising;

a load disposed in said exchangeable optical instrument;

a driven shaft rotatably supported in said exchangeable optical instrument and being into axial contact with said driving shaft under a biasing force of said biasing means;

an interconnecting means transmitting the movement of said driven shaft to said load;

an engaging recess disposed in said driven shaft for engaging with said engaging projection when the angular positions of said shafts are coincident with each other;

a first guide surface formed at the tip end of said driven shaft so as to be brought into axial contact with said engaging projection under the biasing force of said biasing means when the angular positions of said shafts are not coincident with each other thereby guiding said projection therealong for aligning the rotational axes of said shafts with each other; and a second guide surface formed at the bottom of said engaging recess so as to be brought into axial contact with said engaging projection under the biasing force of said biasing means when the angular postions of said shafts are coincident with each other thereby guiding said projection therealong for aligning the rotational axes of said shafts with each other.

8. An exchangeable optical instrument as set forth in claim 7, wherein said second guide surface is formed as a concave curved surface.

9. An exchangeable optical instrument as set forth in claim 7, wherein said first guide surface is formed as a conical concave surface.

10. An exchangebale optical instrument as set forth in claim 7, wherein, said main optical body is a camera body and said exchangeable optical instrument is a lens barrel.

11. An exchangeable optical instrument as set forth in claim 9, wherein said engaging projection includes an incline surface and said conical concave surface includes a gradient almost the same as that of said incline surface.

12. A drive coupling device comprising:

a first portion rotating shaft including a tip end formed as a flat male portion having a pair of flat side walls and a top surface;

a second rotating shaft including a slotted female portion having a pair of side walls for contacting with said pair of flat side walls of said first rotating shaft so as to rotate said shafts simultaneously; and biasing means biasing at least one of said shafts so as to axially contact said shafts with each other, wherein said second rotating shaft further comprising:

a first guide surface formed at the end of said second rotating shaft so as to be brought into axial contact with said top surface under the biasing force of said biasing means when the angular positions of said flat male portion and said slotted female portion are not coincident with each other thereby guiding said top surface therealong for aligning the rotational axes of said shafts with each other; and a second guide surface formed at the bottom of said slotted female portion so as to be brought into axial contact with top surface under the biasing force of said biasing means when the angular positions of said flat male portion and said slotted female portion are coincident with each other thereby guiding said top surface therealong for aligning the rotational axes of sid shafts with each other.

13. A drive coupling device as set forth in claim 12, wherein said second guide surface is formed as a concave curved surface.

14. A drive coupling device as set forth in claim 12, wherein said bottom surface is formed as a conical concave surface.

15. A drive coupling device as set forth in claim 14, wherein said flat male portion further includes an incline shoulder portion having a gradient almost the same as that of said conical concave surface.

* * * * *